Patented June 24, 1930

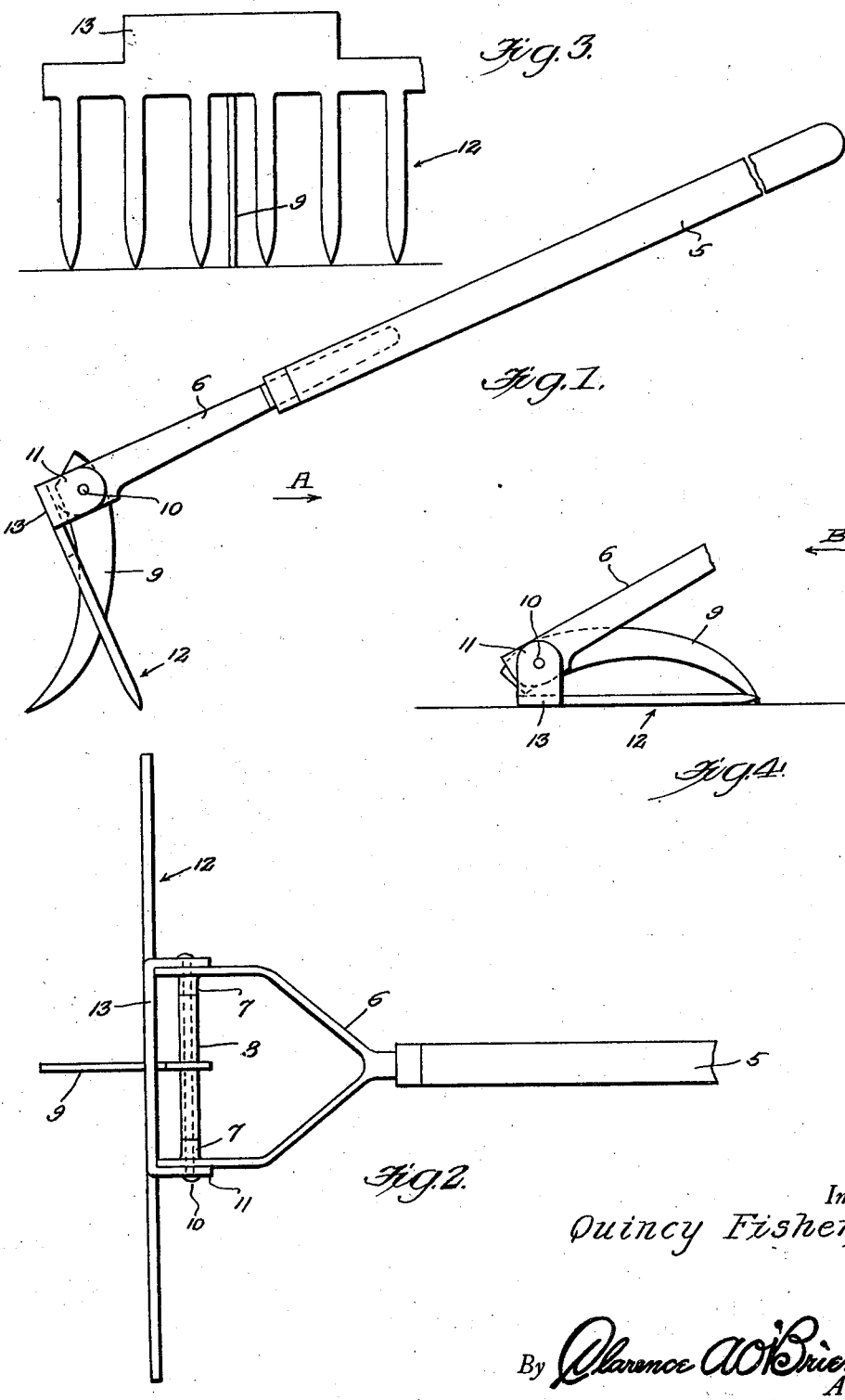

1,766,017

UNITED STATES PATENT OFFICE

QUINCY FISHER, OF OTTAWA, KANSAS

SELF-CLEANING LAWN RAKE

Application filed January 8, 1929. Serial No. 331,105.

The present invention relates to an improved rake for general purposes, but useable particularly for raking lawns, to gather up dead grass or leaves thereon.

The invention has more particular reference to that species of rake, in which the toothed rake head will automatically clear itself of accumulated grass and weeds on the back stroke and which assumes a proper operating position with respect to the handle for efficient raking on the forward stroke.

Briefly described, the invention comprises a handle, a toothed rake head pivotally connected to the handle and adapted to swing under and beneath the handle on the so-called back stroke, and a pivotally mounted drag and lifting finger pivoted on the handle and associated with the rake head to cause the rake head to automatically assume operating position promptly at the beginning of the forward stroke.

My object is to generally improve upon structures of this class by providing one which is characterized by greater simplicity, durability, dependability, and one which is such as to obviate the utilization of easily breakable springs and equivalent elements, such as are ordinarily employed.

Other features and advantages of the invention will become apparent from the following description and drawings.

In the drawings:

Figure 1 is a side elevation of a rake constructed in accordance with the present invention.

Figure 2 is a top plan view thereof.

Figure 3 is a front end elevational view.

Figure 4 is a view showing the collapsed position of parts when making the return or back stroke.

In the drawings, the reference numeral 5 designates a handle provided on its forward end with a fork 6, the ends of the arm portions of which terminate in bearings 7, extending inwardly as shown in Figure 2, and disposed in abutting relation with the opposite ends of the tubular bearing 8, carrying a centrally arranged longitudinally curved lifting and drag finger 9. A pivot pin or bolt 10 passes through these parts and also through the laterally directed end portions 11, forming pivot lugs or ears for the toothed rake head 12. Incidentally, the central portion of the back of the head is raised as at 13, and the end portions of this are utilized in the formation of the pivot ears 11.

Normally, the relationship of parts is as shown in Figure 1, during which time it is assumed that the rake is being drawn toward the user in the direction of the arrow A. This is the forward stroke. At this time, the head 12 assumes a position at right angles to the fork 6, and the lifting finger 9 extends between the teeth and simply drags along the surface. The forward curvature of the lower pointed end facilitates the dragging action. When, however, the rake is moved in the return direction, as indicated by the letter B, in Figure 4, the parts become collapsed and assume the folded relationship here represented. The rake head slides along the surface and the lifting finger drags. At the end of the return stroke and at the beginning of the next forward stroke, the lower end of the curved finger 9 literally digs into the ground and operates as a fulcrum lever in lifting the end portion of the handle up and causing the rake head to assume its normal right angular position again, as shown in Figure 1.

A careful consideration of the description in connection with the drawings will enable the reader to understand the invention and the features thereof. Consequently a more lengthy description is regarded unnecessary.

Minor changes in shape, size, and rearrangement of details coming within the field of invention claimed may be resorted to, in actual practice if desired.

I claim:

1. A garden rake comprising a handle, a toothed raking head pivotally mounted on the forward end of the handle, and a longitudinally curved lifting finger for said head pivotally mounted on said handle and cooperable with the pivotal connection of said head, said finger constituting a drag element and being engageable with the ground.

2. A garden rake comprising a handle, a fork carried by the forward end of the handle, a toothed rake head having rearwardly bent ears pivotally mounted on the free end portions of the arms of said fork, and a longitudinally curved fulcrum and lifting finger for said rake head pivotally suspended between the arms of said fork.

3. A garden rake comprising a handle, having a fork at its forward end, the arms of the fork terminating in inwardly extending oppositely disposed bearings, a lifting and fulcrum finger located centrally between said arms and including a bearing having its ends disposed between and in abutting relation with said first named bearings, a rake head having centrally arranged rearwardly extending pivot and attaching ears, and a pivot pin extending through said ears and said bearings.

In testimony whereof I affix my signature.

QUINCY FISHER.